United States Patent
Marra et al.

[11] Patent Number: 6,071,479
[45] Date of Patent: Jun. 6, 2000

[54] AIR FILTRATION DEVICE

[75] Inventors: Johannes Marra; Theodorus L. G. M. Thijssen, both of Eindhoven; Wilhelmus H. M. Bruggink, Drachten, all of Netherlands

[73] Assignee: U.S. Philips Corporation, New York, N.Y.

[21] Appl. No.: 08/863,996

[22] Filed: May 28, 1997

[30] Foreign Application Priority Data

May 31, 1996 [EP] European Pat. Off. ............ 96201523
Jan. 14, 1997 [EP] European Pat. Off. ............ 97200092

[51] Int. Cl.[7] .............................. A61L 9/16; B01D 50/00
[52] U.S. Cl. .................. 422/122; 422/4; 55/318; 55/471; 55/524
[58] Field of Search .................... 422/120, 122, 422/4; 55/318, 471, 482, 524

[56] References Cited

U.S. PATENT DOCUMENTS

| 2,177,068 | 10/1939 | Hutchinson | 95/181 |
|---|---|---|---|
| 3,925,021 | 12/1975 | Yoshino et al. | |
| 4,289,513 | 9/1981 | Brownhill et al. | 55/387 |
| 4,547,350 | 10/1985 | Gesser | |
| 4,737,173 | 4/1988 | Kudirka et al. | 55/276 |
| 5,514,346 | 5/1996 | Fujita | 422/122 X |

FOREIGN PATENT DOCUMENTS

| 3735251 | 4/1989 | Germany | 422/122 |
|---|---|---|---|
| 62-129142 | 6/1987 | Japan | 422/122 |
| 3-161020 | 7/1991 | Japan | 422/122 |
| 3-238011 | 10/1991 | Japan | 422/122 |
| 6-71137 | 3/1994 | Japan | 422/122 |

*Primary Examiner*—Elizabeth McKane
*Attorney, Agent, or Firm*—Ernestine C. Bartlett

[57] ABSTRACT

An air filtration device (1) comprising:
  a housing (3) having an air inlet (5) and an air outlet (7);
  air displacement means (9) for displacing air from the inlet (5) to the outlet (7) in a direction D through a filter element (11),
the filter element (11) comprising at least one filter unit (13) comprising an absorbent, fibrous material which is impregnated with an aqueous solution of an acid or a base. In a particular embodiment, the filter element comprises two filter units (13,15) in series arrangement, one (15) of which is impregnated with an aqueous solution of an acid and the other (13) of which is impregnated with an aqueous solution of a base. If so desired, at least one filter unit (13,15) may be additionally impregnated with an alkali-metal humectant (such as potassium formate) and/or an organic amine compound selected from the group formed by urea and the alkanol amines (such as tris-hydroxymethylaminomethane). At least one filter unit may also be impregnated with a pH indicator substance.

18 Claims, 2 Drawing Sheets

AIR FILTRATION DEVICE

FIELD OF THE INVENTION

The invention relates to an air filtration device comprising:

a housing having an air inlet and an air outlet;

air displacement means for displacing air from the inlet to the outlet in a direction D through a filter element.

The invention also relates to a filter element for use in such a device.

The term "air filtration device" is intended to refer to any device which can be used to filter certain gaseous substances out of a volume of air. In particular, it refers to such specific devices as motorized air filters, but it is also intended to refer to such devices as air conditioners, air humidifiers, air de-humidifiers, evaporative coolers, ventilators, vacuum cleaners, oxygen supply apparatus, breathing masks, etc., whenever such devices incorporate an air filter element. It should be explicitly noted that the term "gaseous" as here employed is intended to refer both to gases and vapors.

BACKGROUND OF THE INVENTION

A device as specified in the opening paragraph is known from United States Patent U.S. Pat. No. 4,289,513, in which the filter element consists, for example, of a corrugated sheet of fibrous sorption paper which is impregnated with a finely particulate active substance, such as activated carbon or activated silica gel. When air is caused to flow through such a filter element (e.g. in an air intake filter for an internal combustion engine), gaseous pollutants, such as fuel vapors, are intended to be filtered out mainly via a physical reaction with the active substance.

A disadvantage of such a filter element is that it is relatively ineffective in filtering out gaseous pollutants having a molecular weight below about 50–60 (and thus possessing a high volatility). This is inter alia due to the fact that absorption of such volatile substances by activated carbon, alumina or silica gel occurs via a rather weak physical interaction, together with the fact that the activity of such substances is rather "general" in nature, in that they cannot be efficiently targeted at specific gaseous pollutants. In addition, the absorption of many gaseous pollutants by activated carbon, alumina or silica gel deteriorates at high relative humidities ($RH \geq$ about 60%). As a result, many gaseous substances will only be partially filtered out by the known filter, whereas other gaseous substances (such as $NH_3$ and formaldehyde vapor, for example) will not be removed at all.

SUMMARY OF THE INVENTION

It is an object of the invention to provide an air filtration device in which these shortcomings are alleviated. In particular, it is an object of the invention that such a filtration device should be capable of more efficiently filtering gaseous substances of high volatility out of air.

These and other objects are achieved in a device as specified in the opening paragraph, characterized in that the filter element comprises at least one filter unit comprising an absorbent, fibrous material which is impregnated with an aqueous solution of an acid or a base.

An immediate advantage of the air filtration device according to the invention is that the operation of its filter element employs wet-chemical reactions, as opposed to the intrinsically less effective dry physical reactions relied upon in the prior art filter, such wet-chemical reactions being highly effective even at high relative humidities. In addition, a given filter unit is highly dedicated, being specifically designed to filter out either acidic gaseous pollutants (such as carboxylates, mercaptans, $SO_2$, $HNO_2$ and $HNO_3$) or basic gaseous pollutants (such as amines and ammonia). Moreover, as will be further elucidated hereunder, a given filter unit can, if so desired, be impregnated with additional aqueous substances, so as to allow the additional removal of more specific pollutants from the air (such as formaldehyde vapor).

Because of its high efficiency and favorable mass-transfer kinetics, the filter element in the inventive device can be much smaller (thinner) than a comparable prior art filter. In addition to the material savings which this implies, a further advantage is that an air stream traversing the inventive filter element will undergo a smaller pressure-drop than in the prior art filter, which results in quieter operation.

Various acids and bases are suitable for application in impregnating the fibrous material in the filter element. For example, suitable acids include citric acid and phosphoric acid, whereas suitable bases include XOH, $XYHPO_4$, $XYZPO_4$, $XHCO_3$ and $XYCO_3$, wherein X, Y and Z represent alkali metals (not necessarily mutually distinct). These substances are non-odorous, which is essential to applications in human or animal habitations. In addition, they are non-volatile at room temperature, which prolongs the useful life of the filter unit. Moreover, they are relatively hygroscopic, so that they tend to attract moisture to the filter unit, thereby promoting continued high efficiency of the wet-chemical reactions on which the operation of a filter unit is based.

An advantageous embodiment of the device according to the invention is characterized in that the filter element comprises two filter units in series arrangement, one of which is impregnated with an aqueous solution of an acid and the other of which is impregnated with an aqueous solution of a base. With such a filter element, it is possible to efficiently remove both basic and acidic pollutants from air.

The choice as to whether a filter unit is impregnated with an acidic or a basic solution or both will depend inter alia on the intended application environment of the air filtration device. For example, one can envisage air filtration devices which are specifically tailored to:

(1) smoky environments (e.g. restaurants and bars);

(2) odorous environments (e.g. lavatories and locker rooms);

(3) polluted environments (e.g. buildings in large cities or near large industrial complexes).

In case (1), good results will generally be achieved with an acid-impregnated filter unit, whereas a base-impregnated filter unit will generally give better results in cases (2) and (3). Of course, even better results will be achieved in all three cases if a double filter unit is employed, as described in the previous paragraph.

Another advantageous embodiment of the device according to the invention is characterized in that at least one filter unit is additionally impregnated with a humectant. The purpose of such a (hygroscopic) humectant is to better guarantee that the filter unit remains satisfactorily moist—thereby ensuring that the filter's absorption reactions retain a high efficiency—even under conditions of low relative air humidity (down to $RH \approx 10–20\%$, for example). Suitable examples of such humectants include urea, inorganic lithium salts, $X'Y'HPO_4$, $X'Y'Z'PO_4$, and various organic alkali-metal compounds, such as X' lactate, X' formate, X' acetate, X' methylsulphate, X' ethylsulphate, X' propylsulphate, X'Y'Z' citrate, X'Y' camphorate, X'Y' glycerophosphate, X' glycolate, X'Y' succinate, X'Y' tartrate, X'Y' malonate, X' formaldehyde sulphoxylate, and their mixtures, wherein X', Y' and Z' represent alkali metals (not necessarily mutually distinct, and not necessarily distinct from the alkali metals X and Y referred to above). If so desired, more than one humectant may be employed in a given filter unit.

A further embodiment of the device according to the invention is characterized in that at least one filter unit is additionally impregnated with at least one organic amine compound selected from the group formed by urea and the alkanol amines. The purpose of such impregnation is the absorption of formaldehyde vapor from the air. Formaldehyde (HCHO) occurs in tobacco smoke and vehicle exhaust fumes, and is also emitted from urea-formaldehyde foam insulation and pressed-wood products, for example. Even in concentrations as low as 0.1 ppm, it can cause considerable irritation of the eyes, skin and airways, particularly in people suffering from asthma or emphysema. An example of a particularly suitable alkanol amine in the current context is tris-hydroxymethylaminomethane.

A surprising aspect of the invention is that, whereas $XHCO_3$ on its own or urea on its own will not absorb formaldehyde vapor, the combination of $XHCO_3$ and urea is very effective at doing so.

A particular embodiment of an air filtration device according to the invention is characterized in that at least one filter unit is impregnated with an aqueous solution comprising:

| | | |
|---|---|---|
| base: | 5–30 | wt. % |
| humectant: | 0.5–5 | wt. % |
| organic amine compound: | 2–15 | wt. % |

These ranges refer to percentages by weight ("wt. %"), and are chosen so as to prevent the filter unit from becoming ineffective due to drying out, down to a minimal relative air humidity of about 10–20%, while also preventing oversaturation (leaking) of the filter unit, up to a maximal relative air humidity of about 90–95%. If so desired, one may employ more than one humectant and/or more than one organic amine compound, in which case the weight-percentages given above refer to total (sum) quantities.

A further embodiment of the inventive air filtration device is characterized in that at least one filter unit is impregnated with an aqueous solution comprising:

| | |
|---|---|
| acid: | 5–50 wt. % |
| organic amine compound: | 5–30 wt. % |

As in the previous paragraph, these concentrations ensure satisfactory use of the filter unit at air humidities in the approximate range 20–95 %. Once again, if so desired, one may employ more than one organic amine compound, in which case the weight-percentage given above refers to a total (sum) quantity.

In a preferred embodiment of the air filtration device according to the invention, at least one filter unit is provided with means for visually indicating that the filter unit has been exhausted beyond a certain level. In such a device, the consumer can readily see when a filter unit has been exhausted to a point where its efficiency is no longer satisfactory, and can thus replace the filter unit on time. In a particular embodiment, a pH indicator substance is incorporated in the filter unit, which substance changes its color once a certain amount of gas has been absorbed in the filter unit. Examples of suitable pH indicator substances include:

For use in an acid-impregnated filter unit: bromophenol blue, bromochlorophenol blue, bromocresol green, congo red, methyl red and their alkali-metal salts. Such substances undergo a color change in dilute aqueous solution when the pH of that solution increases from 3.0 to 5.0, for example;

For use in a base-impregnated filter unit: neutral red, phenol red, bromothymol blue, alizarin, bromoxylenol blue and their alkali-metal salts. Such substances undergo a color change in dilute aqueous solution when the pH of that solution decreases from 8.0 to 6.0, for example.

The pH indicator substance can be conveniently incorporated in a given filter unit together with other chemical impregnants if all such chemicals are first mixed together and then dissolved so as to form an aqueous impregnant solution. The amount of pH indicator substance should be sufficiently high to ensure clearly visible discoloration of the filter unit when it becomes exhausted; to this end, in a preferential embodiment of the inventive filter unit, the amount of pH indicator substance in the impregnant solution should lie in the range 0.01–0.5 wt %. For reasons of economy (for example), one may choose to incorporate the pH indicator substance in only a limited portion of the filter unit; one may then isolate such a portion from the surrounding filter material using, for example, a glass or plastic barrier, so as to prevent unwanted leakage of the pH indicator substance out of the said portion.

The absorbent, fibrous material of the filter unit(s) may, for example, be selected from the group formed by glass fiber papers, crêpe papers, Kraft papers, wool, silk, cellulosic fiber fabrics (such as cotton, linen, viscose or rayon) and synthetic fiber fabrics (such as nylon, polyester, polyethene, polypropene, polyvinylalcohol, acrylics, polyamide and carbon fiber). It should be explicitly noted that the fibrous material employed in different filter units need not be the same.

In a preferential embodiment of the device according to the invention, the fibrous material is selected from the group formed by hydrophilic glass fiber paper and ozone-bleached crêpe paper (such as ozone-bleached coffee filter paper). Apart from being chemically inert, having the desired wet-strength and being highly absorbent, such papers are particularly odorless when impregnated with the aqueous solutions referred to above. Specific example of such papers include *Whatman GF/A* (Whatman, United Kingdom), *Sibille Dalle filtre à café blanc RH* 57 gsm and Sibille Dalle sup/super hydrocel blanc 49 gsm (PSG PILLO-PAK, Eerbeek, The Netherlands).

A further preferential embodiment of the inventive device is characterized in that the fibrous material is interspersed with a plurality of relatively straight, open-ended channels which extend substantially parallel to the direction D. The inventors have found that such an embodiment ensures optimal interaction of an air stream in the direction D with the chemicals in a filter unit, allowing the filter unit to have a minimal depth $d_u$ in the direction D for a given average air speed $v_a$. Specific embodiments of this concept include filter elements in which:

(a) at least one filter unit comprises a plurality of mutually parallel sheets of the fibrous material, each sheet extending substantially parallel to the direction D;

(b) at least one filter unit comprises a plurality of corrugated sheets of the fibrous material, the corrugations extending substantially parallel to the direction D.

A further embodiment of the device according to the invention is characterized in that the smallest dimension $d_c$ of the channels measured perpendicular to the direction D lies in the range 0.25–4 mm. For air speeds $v_a$ of the order of 0.5–1.5 m/s, values of $d_c$ in the quoted range generally ensure a laminar flow of air through the filter unit.

In addition to the filter units already referred to heretofore, the filter element may comprise additional components (in series arrangement) which are intended to fulfil general or specific purposes. For example, it is possible to incorporate a special (dry) filter for absorbing particulate matter such as dust or soot, or to employ an extra wet-chemical filter which is intended to remove a specific substance such as mercury vapor. It is also possible to incorporate an activated carbon filter into the device, for the removal of less-volatile hydrocarbon gases, radon, ozone and $NO_2$. Moreover, one can intentionally include an aroma pad in the device, so as to (lightly) perfume the air emerging therefrom.

BRIEF DESCRIPTION OF THE DRAWINGS

The invention and its attendant advantages will be further elucidated with the aid of exemplary embodiments and the accompanying schematic drawings, whereby.

Corresponding features in the various Figures are denoted by identical reference symbols.

Embodiment 1

Figure 1:
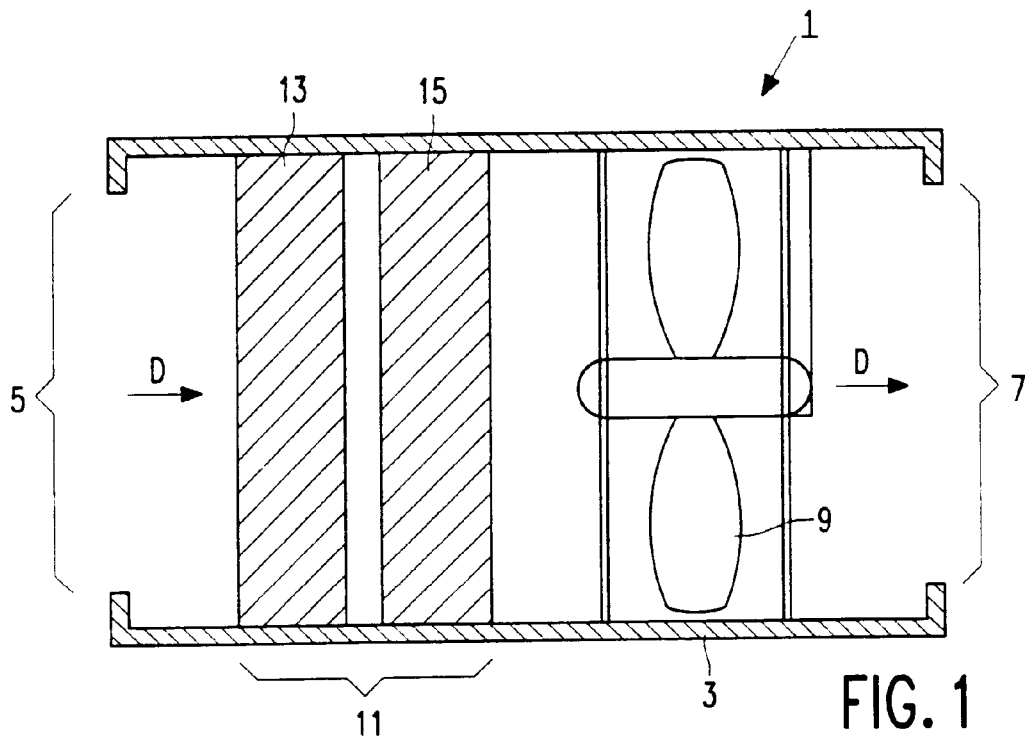
FIG. 1 is a cross-sectional view of a particular embodiment of an air filtration device according to the invention.

FIG. 1 renders a cross-sectional view of a particular embodiment of an air filtration device 1 according to the invention. The device 1 comprises a housing 3 having an air inlet 5 and an air outlet 7. Also present are means 9 for causing a flow of air from the inlet 5 to the outlet 7 in a direction D through a filter element 11. The means 9 are here embodied as an electric fan which sucks air through the element 11 in the direction D.

The filter element 11 comprises a first filter unit 13 and a second filter unit 15 in series arrangement. Each of the units 13, 15 comprises an absorbent, fibrous material which is impregnated with an aqueous solution. In this particular embodiment, the fibrous material is a hydrophilic glass-fiber paper (Whatman GF/A), and the units 13, 15 are impregnated as follows:

| Filter unit 13 | | Filter unit 15 | |
|---|---|---|---|
| $KHCO_3$: | 20 wt. % | citric acid: | 15 wt. % |
| K formate: | 1 wt. % | urea: | 15 wt. % |
| urea: | 5 wt. % | | |

As an alternative to 5 wt. % urea, filter unit 13 may also comprise 5 wt. % tris-hydroxymethylaminomethane. As an alternative to 15 wt. % citric acid and 15 wt. % urea, filter unit 15 may also comprise 24 wt. % $H_3PO_4$ and 5 wt. % urea. If so desired, filter unit 13 may additionally comprise 0.07 wt. % phenol red, and filter unit 15 may additionally comprise 0.07 wt. % bromophenol blue.

Embodiment 2

In an alternative embodiment to that specified in Embodiment 1, the fibrous material is an ozone-bleached crêpe paper, and the units 13 and 15 are impregnated as follows:

| Filter unit 13 | | Filter unit 15 | |
|---|---|---|---|
| $KHCO_3$: | 20 wt. % | citric acid: | 35 wt. % |
| K formate: | 4 wt. % | urea: | 5 wt. % |
| urea | 3 wt. % | bromophenol blue: | 0.07 wt. % |
| tris-HAM | 4 wt. % | | |
| phenol red | 0.07 wt. % | | | wherein the term tris-HAM is used as shorthand notation for tris-hydroxymethylaminomethane.

Embodiment 3

Figure 2:
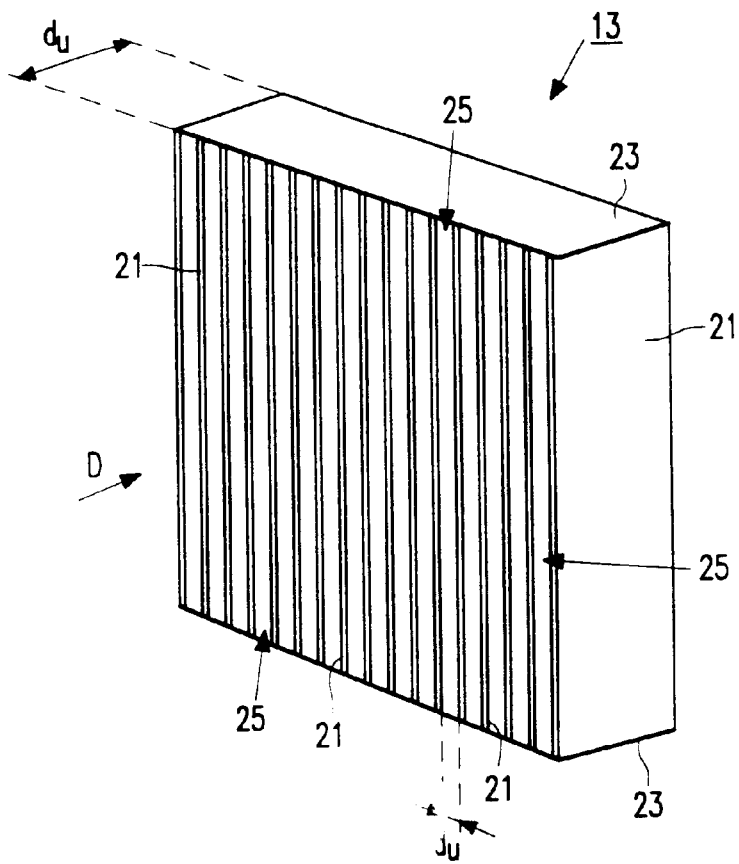
FIG. 2 is a perspective view of a particular embodiment of a filter unit suitable for use in the subject of FIG. 1.

FIG. 2 is a perspective view of a particular filter unit 13 suitable for use in an air filtration device 1 according to the invention. The fibrous material of the unit 13 is interspersed with a plurality of relatively straight, open-ended channels 25 which extend substantially parallel to the direction D. As here depicted, this is achieved by embodying the fibrous material as a series of mutually parallel planar sheets 21 which are glued to supports 23 at two opposite extremities, the gaps 25 between neighbouring sheets 21 acting as the channels hereabove referred to. This arrangement corresponds to case (a) above.

In this particular embodiment, the sheets 21 have a thickness of 0.35 mm and a depth $d_u$ of 42 mm in the direction D. The smallest dimension $d_c$ of the channels 25 (in this case, the mutual separation of the sheets 21) is 1 mm. The filter unit 13 has a square cross-section perpendicular to the direction D, measuring 28×28 $cm^2$. Assuming an average air speed $v_a$ of 1.4 m/s in the direction D, the filter unit 13 can filter 300 $m^3$ of air per hour, with a pressure-drop of 13 Pa in the direction D.

Embodiment 4

Figure 3:
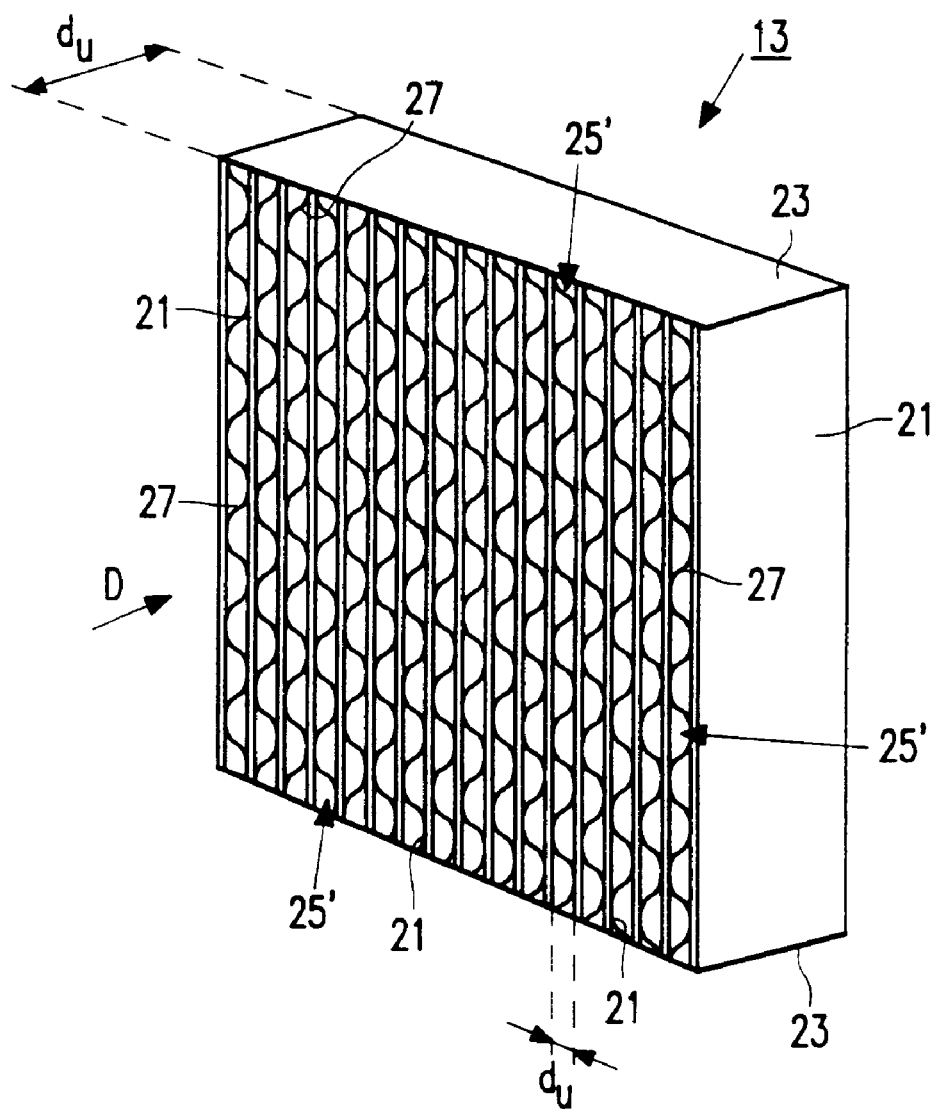
FIG. 3 is a perspective view of an alternative embodiment of the subject of FIG. 2.

FIG. 3 shows a perspective view of a filter unit 13 which represents a modification of the subject of FIG. 2. In this alternative, corrugated sheets of fibrous material separate adjacent sheets 21. The corrugations 27 define air channels 25' which extend parallel to the direction D. This arrangement corresponds to case (b) above.

As here depicted, the period of the corrugations 27 is greater than their height, so that the smallest dimension $d_c$ of the channels 25' is the mutual separation of the sheets 21.

In particular embodiment, the filter unit 13 has a square cross-section measuring 28×28 $cm^2$ perpendicular to the direction D, the thickness of the sheets 21 is 0.2 mm, the value of $d_c$ is 1 mm, and the depth $d_u$ is 27 mm. Assuming an average air speed $v_a$ of 1.7 m/s parallel to the direction D, the filter unit 13 can filter 300 $m^3$ of air per hour, with a pressure-drop of 27 Pa in the direction D.

As an alternative to the arrangement depicted in FIG. 2, a long corrugated sheet of fibrous material can be rolled up into a spiral roll, and arranged so that its cylindrical axis is parallel to the direction D.

Embodiment 5

In a particular experiment performed by the inventors, a crêpe-paper filter unit 15 identical to that described in Embodiment 4 was immersed in a bath comprising approximately 1 kg of an aqueous solution of 24 wt. % $H_3PO_4$ and 5 wt. % urea. After being allowed to soak for 10 minutes, the unit 15 was removed from the bath and allowed to dry at ambient humidity (60%). It was found that the unit 15 had absorbed all of the aqueous solution from the bath.

We claim:

1. An air filtration device comprising:
   a housing having an air inlet and an air outlet;
   air displacement means for displacing air from the inlet to the outlet in a direction D through a filter element, wherein the filter element comprises at least one filter unit comprising an absorbent, fibrous material selected from the group consisting of hydrophilic glass fiber paper and ozone-bleached crêpe paper which is impregnated with an aqueous solution of an acid or a base, and wherein said at least one filter unit is additionally impregnated with at least one organic amine compound selected from the group consisting of urea and an alkanol amine.

2. A device according to claim 1, wherein the filter element comprises two filter units in series arrangement, one of which is impregnated with an aqueous solution comprising an acid and the other of which is impregnated with an aqueous solution comprising a base.

3. A device according to claim 2 wherein at least one filter unit is additionally impregnated with a humectant.

4. A device according to claim 1, wherein at least one filter unit is additionally impregnated with a humectant.

5. A device according to claim 1, wherein at least one filter unit is impregnated with an aqueous solution comprising:

| base: | 5–30 | wt. % |
| humectant: | 0.5–5 | wt. % |
| organic amine compound: | 2–15 | wt. % |

6. A device according to claim 5 wherein at least one additional filter unit is present, said one additional filter unit being impregnated with an aqueous solution comprising:

| acid: | 5–50 wt. % |
| organic amine compound: | 5–30 wt. %. |

7. A device according to claim 1, wherein at least one filter unit is impregnated with an aqueous solution comprising:

| acid: | 5–50 wt. % |
| organic amine compound: | 5–30 wt. %. |

8. A device according to claim 1, wherein a pH indicator substance is incorporated in at least one filter unit, which substance changes its color once a certain amount of gas has been absorbed in the filter unit.

9. A device according to claim 1, wherein the fibrous material is interspersed with a plurality of relatively straight, open-ended channels which extend substantially parallel to the direction D.

10. A device according to claims 9, wherein the smallest dimension of the channels measured perpendicular to the direction D lies in the range 0.25–4 mm.

11. A filter element which comprises at least one filter unit comprising an absorbent, fibrous material selected from the group consisting of hydrophilic glass fiber paper and ozone-bleached crêpe paper which is impregnated with an aqueous solution of an acid or a base, and wherein said at least one filter unit is additionally impregnated with at least one organic amine compound selected from the group consisting of urea and the alkanol amines.

12. A filter element as claimed in claim 11 wherein the filter element comprises two filter units is series arrangement, one of which is impregnated with an aqueous solution which comprises an acid and the other of which is impregnated with an aqueous solution which comprises a base.

13. A filter element as claimed in claim 11 wherein at least one filter unit is additionally impregnated with a humectant.

14. A filter element as claimed in claim 11 wherein at least one filter unit is impregnated with an aqueous solution comprising:

| base: | 5–30 | wt. % |
| humectant: | 0.5–5 | wt. % |
| organic amine compound: | 2–15 | wt. % |

15. A filter element as claimed in claim 11 wherein at least one filter unit is impregnated with an aqueous solution comprising:

| acid: | 5–50 wt. % |
| organic amine compound: | 5–30 wt. %. |

16. A filter element as claimed in claim 11 wherein a pH indicator substance is incorporated in at least one filter unit, which substance changes its color once a certain amount of gas has been absorbed in the filter unit.

17. A filter element as claimed in claim 11 wherein the fibrous material is interspersed with a plurality of relatively straight, open-ended channels which extend substantially parallel to the direction D.

18. A filter element as claimed in claim 17 wherein the smallest dimension of the channels measured perpendicular to the direction D lies in the range 0.25–4 mm.

* * * * *